United States Patent Office 2,856,386
Patented Oct. 14, 1958

2,856,386

ALLYL CARBAMATE HOMOPOLYMERS AND COPOLYMERS

Donald A. Smith and Cornelius C. Unruh, Rochester, N. Y., assignors to Eastman Kodak Company, Rochester, N. Y., a corporation of New Jersey No Drawing. Application February 1, 1954
Serial No. 407,582

7 Claims. (Cl. 260—77.5)

This invention relates to certain monomeric materials and to homopolymers and copolymers thereof, and is particularly concerned with allyl or methallyl esters of carboxy or carbalkoxy carbamic acids, and to homopolymers of such monomers or copolymers with a vinylic monomer.

Among the useful polymeric materials which have been prepared are those polymers which contain free carboxyl groups in the polymer molecule, or which contain groups from which carboxyl groups can readily be generated by hydrolysis or the like. The presence of even a small proportion of such carboxyl groups greatly increases the usefulness of the polymers, since, in the case of fiber-forming polymers, the presence of free carboxyl groups makes it possible to dye the fibers with basic dye molecules much more readily than when such carboxyl groups are absent. Furthermore, the presence of carboxyl groups in the molecule affects the water solubility and water permeability of the polymers whereby the polymers can be used in various emulsion applications such as in the manufacture of photographic products where it is desired to have a material which is not soluble in water, but which is permeable to water and particularly to aqueous salt solutions. In many cases, the free carboxyl groups can be reacted to form an ionizable salt whereby the solubility in water or the permeability of the material can be varied over wide limits.

A large number of monomeric materials containing carboxyl groups have been used for the preparation of polymers. These include acrylic and α-alkylacrylic acids, crotonic acid, vinyl acetic acid, maleic ester acids, maleic anhydride, allyloxy acetic acid, and the like. In some cases, these monomers have undesirable copolymerization characteristics and hence are unsuitable for use in the preparation of copolymers which might be used where free carboxyl groups are desirable. In other cases, such monomeric materials, when copolymerized, can undergo intramolecular reaction with hydroxyl and amino groups, whereby the desirable characteristics of the free carboxyl groups are removed. Thus, for example, copolymers of vinyl acetate with such acidic monomers as acrylic acid, crotonic acid, and maleic anhydride or its esters, when hydrolyzed and subjected to acidic conditions, readily form intramolecular lactones. This tendency towards lactonization is overcome in some cases when the carboxyl group is sufficiently removed from the polymerizing ethylenic bond. Thus, for example, allyloxy acetic acid has been employed to form copolymers which do not undergo lactonization. It is desirable, however, to be able to prepare other polymeric materials having the desirable free carboxyl function, and which can be readily hydrolyzed under acidic conditions without objectionable lactonization.

It is accordingly an object of this invention to provide new and useful monomeric materials containing carboxy or carbalkoxy groups, and which can be homopolymerized or copolymerized to form polymers which contain free carboxyl groups, or which contain groups from which free carboxyl groups can be readily generated by hydrolysis or the like.

Another object of the invention is to provide a new class of polymeric materials which possess good water permeability, but which are in themselves largely water insoluble, and which are, therefore, useful in the preparation of photographic emulsions, dyeable fibers, and the like.

Another object of the invention is to provide a new class of polymerizable carbamate monomers which can be employed in the preparation of polymers quite unlike the hard and brittle homopolymers and copolymers which were characteristic of the allyl carbamates employed heretofore.

Another object of the invention is to provide a class of new and useful polymeric materials containing a sufficient percentage of carboxyl groups or carboxyl-producing groups to greatly modify the physical properties of the polymers, and which can be acetalized or hydrolyzed or converted to amides which exhibit useful water permeability without objectionable water solubility.

Another object of the invention is to provide a new group of polymerizable monomers which are allyl or methallyl esters of carboxy or carbalkoxy carbamic acids, and which are readily prepared from known materials by a simple and straightforward process.

Another object of the invention is to provide new copolymers of an allyl or methallyl ester of a carboxy or carbalkoxy carbamic acid with a monoethylenically-unsaturated monomer containing a —CH=C< group.

Other objects will be apparent from the description and claims which follow.

These and other objects are attained by means of this invention, which is described in detail hereinafter with particular reference to certain preferred embodiments thereof. The monomeric materials embodying this invention are the allyl or methallyl esters of carboxy or carbalkoxy carbamic acids having the formula

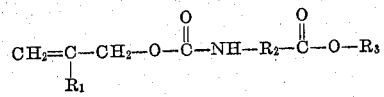

wherein $R_1$ is either hydrogen or a methyl group, $R_2$ is either an alkylene group containing from 1 to 6 carbon atoms or a phenylene group, and $R_3$ is either hydrogen or an alkyl group containing from 1 to 4 carbon atoms. These monomeric materials are readily polymerized in accordance with this invention to give homopolymers or copolymers which either contain free carboxyl groups or contain carbalkoxyl groups which can be readily hydrolyzed to free carboxyl groups. The polymers embodying this invention are prepared by homopolymerizing such a monomeric material in accordance with usual polymerization practices, or by copolymerizing one or more of such monomeric materials with each other, or with a vinylic monomer characterized by a single —CH=C< group, and desirably a $CH_2$=C< group, as described hereinafter.

The monomers embodying this invention are readily prepared by reacting a carbalkoxy isocyanate with allyl or methallyl alcohol to give a carbalkoxy carbamic acid allyl or methallyl ester. These monomers can then be polymerized, or they can be first hydrolyzed to generate free carboxyl groups before polymerization. A large number of carbalkoxy isocyanates are known, and these are usually prepared by the action of phosgene on amino acid ester hydrochlorides, such as glycine, alanine, valine, leucine and other α-amino acid ester hydrochlorides, є-amino acid ester hydrochlorides, o-aminobenzoic acid ester hydrochlorides, m-aminobenzoic acid ester hydrochlorides, p-aminobenzoic acid ester hydrochlorides, and the like. The preparation of such carbalkoxy isocyanates forms no part of this invention, and any method for preparing such materials can be used. A typical method which is suitable is described in Annalen, 562, 105 (1949). The carbalkoxy isocyanates which are preferably employed are those in which the alkoxy group preferably contains from 1 to 4 carbon atoms, and desirably are the carbalkoxy alkyl or phenyl isocyanates wherein the alkyl group contains from 1 to 6 carbon atoms. The monomers embodying the invention include any of the monomers within the structural formula set out hereinabove including the allyl and methallyl (carbomethoxy methyl) carbamates; allyl and methallyl (carbomethoxy ethyl) carbates; allyl and methallyl (carbethoxy methyl) carbamates; allyl and methallyl (carbethoxy ethyl carbamates); allyl and methallyl (carboxymethyl) carbamates; allyl and methallyl (carboxyethyl) carbamates; allyl and methallyl (carboxyphenyl) carbamates; allyl and methallyl (carbomethoxyl phenyl) carbamtaes; allyl and methallyl (carbethoxyphenyl) carbamates and the like.

The reaction between such carbalkoxy isocyanates and allyl or methallyl alcohol proceeds readily without the use of a catalyst, and in most cases the reaction can be initiated by merely warming the reaction mixture. The reaction is usually exothermic and is controlled by cooling the reaction mixture. It may be desirable to heat the reaction mixture to a slightly elevated temperature, such as steam bath temperatures, after the heat of reaction has subsided. The monomers thereby obtained can be purified by distillation or other well known purification means whereby unreacted material is removed from the product. This monomeric material can then be used directly in forming the polymers embodying this invention, or it can be hydrolyzed to the corresponding free carboxy derivative by treatment with an aqueous solution of a basic hydroxide such as sodium hydroxide, potassium hydroxide, or the like. The resulting carboxy carbamate derivative can then be polymerized in the same manner as the carbalkoxy derivatives.

The polymerization of the monomeric materials embodying this invention is readily effected in accordance with the usual polymerization practices employed for polymerizing unsaturated monomers. Many of the monomers prepared in accordance with this invention are liquid and hence can be polymerized either alone or in admixture with other polymerizable monomers without the use of a polymerization medium, although the polymerization can be effected by means of emulsion or solution polymerization in either aqueous or solvent medium. The polymerization is facilitated by the use of a polymerization catalyst and elevated temperatures. The nature of the polymerization catalyst is not critical, and any of the well known catalytic materials can be employed. Usually the so-called per-catalysts such as the peroxides and persulfates are employed to catalyze the polymerization. Such materials are well known in the art, and it is not intended that the scope of the invention shall be limited to the use of any particular catalytic materials. Typical per-catalysts which are useful in practicing the invention include such materials as benzoyl peroxide, hydrogen peroxide, potassium persulfate, and the like. Temperatures of from about 50 to about 100° C. are usually employed in effecting the polymerization, although higher or lower temperatures can be employed in accordance with usual practice. The reaction time will depend, of course, upon the reactants employed, the nature and amount of polymerization catalyst, the temperature of polymerization, and similar variable factors. Thus, for example, the polymerization may be effected in a period of from a few hours to several days, depending upon the reaction conditions. When a copolymer is desired, the monomers embodying this invention can be reacted with any of the well known monoethylenically unsaturated monomers containing a —CH=C< group, including the vinyl esters, such as vinyl acetate, vinyl butyrate and the like; vinylidene compounds such as vinylidene chloride or the like; vinyl halides, such as vinyl chlorides; acrylates and methacrylates, such as methyl acrylate, methyl methacrylate, ethyl acrylate, ethyl methacrylate and the like; acrylonitrile; styrene; substituted styrenes; acrylamides, such as N-isopropyl acrylamide and the like; fumaramides; fumaramates; citraconamates; citraconamides; maleamates; maleamides; and similar well known monoethylenically unsaturated copolymerizable materials. In some cases it may also be desirable to further modify the properties of the resulting polymers by including in the monomeric mixture a polyvinyl alcohol derivative which has a long hydrocarbon chain appended to the polyvinyl alcohol. Such materials alone give polymers which are insoluble to hot water, but which are permeable to salt solutions such as are used in processing photographic emulsions. By copolymerizing such a hydrocarbon substituted polyvinyl alcohol with a monomer embodying this invention, and in some cases with a further monoethylenically unsaturated monomer, polymers are obtained which have a greater permeability to alkaline solutions than is the case with the polymers prepared from the hydrocarbon modified polyvinyl alcohols alone.

In some cases it is desirable to further modify the properties of the polymers embodying this invention by acetalizing the homopolymers or copolymers. This is readily effected by reacting the homopolymers or copolymers with an aldehyde such as paraldehyde, acetaldehyde, butyraldehyde, or the like, to give polyacetals which usually contain some free carboxyl groups. These acetals can be readily hydrolyzed by treatment with an aqueous solution of base to give polymeric materials which are soluble in many organic solvents and in basic solutions, but which are not soluble in dilute acid solutions or in water alone. Likewise the acetal derivatives of the polymers can be reacted with ammonia or ammonium hydroxide, whereby clear, colorless gels are obtained.

The polymeric materials embodying this invention can be used for a variety of applications and find particular utility in the field of photographic emulsions. They can be used either alone or in admixture with gelatin or similar hydrophilic colloids in the preparation of either black-and-white or color film or photosensitive papers. They also can be used as a carrier for the photosensitive materials such as the silver halides or other photographic film ingredients. Because of their excellent permeability characteristics, the materials prepared in accordance with this invention can be used in the image forming layers of photosensitive materials, or they can be used as a protective layer or as a subbing layer in laminated photosensitive sheet material. Both the monomers and the polymers embodying this invention, of course, can be prepared by either batch or continuous processes in accordance with known chemical practice.

The invention is illustrated by the following examples of certain preferred embodiments thereof. It will be understood that the examples are included for purposes of illustration and are not intended to limit the scope of the invention as described herein unless otherwise specifically indicated.

*Example 1*

A mixture of 160 g. of carbethoxymethyl isocyanate and 200 g. of allyl alcohol was warmed gently. In a few minutes a vigorous reaction was initiated which was moderated by cooling the reaction vessel. The reaction was allowed to proceed until the heat subsided, whereupon the mixture was heated on the steam bath for one hour. The resulting monomeric product was distilled, and after the excess allyl alcohol was removed, almost all of the residue distilled at 135–137° C. at 6–7 mm. Hg. The yield of monomeric allyl (carbethoxymethyl)carbamate was 90 percent of the theoretical yield. The product analyzed for 51.1% carbon, 7.3% hydrogen and 7.9% nitrogen, as compared to a calculated analysis for $C_8H_{13}NO_4$ of 51.3% carbon, 7.0% hydrogen and 7.5% nitrogen.

Example 2

The carbalkoxy carbamate esters prepared in accordance with the preceding example are readily hydrolyzed to the corresponding carboxy derivative. Thus 160 g. of allyl (carbethoxymethyl)carbamate was mixed with a solution of 22 g. of sodium hydroxide in 50 ml. of water. When the mixture was shaken, heat was evolved, and the reaction was moderated by cooling the container. The clear, homogeneous liquid which was thereby obtained was faintly alkaline to phenolphthalein, and this liquid was then made acid to Congo red paper by the cautious addition of concentrated hydrochloric acid. The resulting solution was extracted with ether, and the ether extract was evaporated down to a nearly colorless viscous liquid. The allyl (carboxymethyl)carbamate thus obtained was then distilled through a short Vigreaux column, the major portion distilling at 155–158° C. at 1 mm. Hg. The product analyzed for C, 45.4; H, 5.9; and N, 8.8 as compared to a calculated analysis for $C_6H_9NO_4$ of C, 45.3; H, 5.7; and N, 8.8.

Example 3

A mixture of 10.0 g. of allyl (carbethoxymethyl)carbamate and 0.05 g. of benzoyl peroxide was sealed in a glass tube and heated in a 60° C. bath. After 23 hours the tube was opened, and 0.10 g. of benzoyl peroxide was added to the colorless liquid. The tube was then resealed and returned to the 60° C. bath. After another 72 hours a further 0.10 g. of benzoyl peroxide was added to the colorless viscous product. After another 3 days the product was a clear, colorless viscous mass, which was diluted with a little methanol, and the solution was poured into ether. A fine, white homopolymer of allyl (carbethoxymethyl)carbamate precipitated out and was dried at 40° C.

Example 4

A mixture of 86.0 g. of vinyl acetate, 14.0 g. of allyl (carbethoxymethyl)carbamate, 0.5 g. of benzoyl peroxide, and 40 ml. of methanol was charged into a 500 ml. flask fitted with a reflux condenser. The air in the flask was replaced by nitrogen, and the flask and contents were placed in a 60° C. bath. After 5 hours an increase in viscosity was apparent, and after 3 days a viscous, clear and colorless mass had formed. This was dissolved in 170 ml. of methanol to give approximately a 30 percent solution. A portion of this solution was poured into an excess of agitated ether, and the soft, white precipitate thus obtained was redissolved in methanol and reprecipitated by pouring it into an excess of agitated water. The resulting polyallyl (carbethoxymethyl)carbamate copolymer was dried at 40° C. and analyzed for 1.1% nitrogen and 3.2% ethoxyl. Thus the copolymer contains the allyl carbamate monomers in approximately the same ratio that was present in the monomer mixture.

Example 5

Similar results are obtained using the carboxy monomers instead of the carbalkoxy monomers. Thus a mixture of 15 g. of vinyl acetate, 5 g. of allyl (carboxymethyl)carbamate and 0.5 g. of benzoyl peroxide was placed in a glass tube, and the supernatant atmosphere was displaced by nitrogen. The tube was then sealed and placed in a 60° C. constant temperature bath. After one day a very viscous, clear, colorless mass was obtained, and after two days a nonflowing, clear, colorless mass had resulted. This copolymer was then dissolved in methanol and precipitated into water. The white, slightly soft precipitate was then dried at 40° C. This copolymer had a carboxyl content of 5.8 percent and was completely and readily soluble in dilute aqueous sodium hydroxide solution. Upon acidification of this solution with acetic acid, a white, fibrous polymer precipitated which contained 20.6% of combined allyl (carboxymethyl)carbamate.

Example 6

To 20 g. of 1% solution of allyl (carboxymethyl)carbamate in vinyl acetate was added 0.05 g. of benzoyl peroxide, and the solution was heated at 60° C. in a sealed glass tube for 23 hours. A clear, colorless, nonflowing polymer was obtained. The procedure was then repeated using 20 g. of a 2% solution of allyl (carboxymethyl)carbamate in vinyl acetate. Again, after 23 hours heating at 60° C., a clear, colorless, nonflowing polymer was obtained.

Example 7

To a solution of 5.0 g. of allyl (carbethoxymethyl) carbamate and 5.0 g. of vinyl acetate was added 0.050 g. of benzoyl peroxide, and the solution was sealed in a glass tube and placed in a 60° C. bath. After one week the product was a clear, colorless, nonflowing mass. This was dissolved in methanol, the solution was poured into ether and the soft, gummy precipitate was redissolved in methanol and poured into water, the precipitate being dried at 40° C. A nitrogen analysis indicated that the product contained 48.1 percent by weight of allyl (carbethoxymethyl)carbamate.

Example 8

A solution of 3.0 g. of allyl (carboxymethyl)carbamate, 3.0 g. of vinyl acetate, and 0.050 g. of benzoyl peroxide was sealed in a glass tube and placed in a 60° C. bath. After one week the product was a hard, clear, colorless mass. This was dissolved in methanol and poured into ether. The soft, gummy precipitate was redissolved in methanol and the solution was poured into water. The precipitate was dried at 40° C. and a carboxyl analysis indicated that it contained 40.6 percent by weight of allyl (carboxymethyl)carbamate. The polymer was soluble in dilute alkali.

Example 9

The carbalkoxy carbamate monomers can be hydrolyzed prior to polymerization as described in order to give free carboxyl groups in the resulting polymer. It is not necessary, however, to effect the hydrolysis before polymerization, since the polymer itself can be hydrolyzed with aqueous alkali to give a polymer containing a substantial amount of free carboxyl groups. Thus, for example, 70 g. of an approximately 30 percent solution of a copolymer of vinyl acetate and allyl (carbethoxymethyl)carbamate, prepared as in Example 4 and containing approximately 14 percent by weight of allyl (carbethoxymethyl)carbamate, was mixed with 10 ml. of a 10 percent solution of sodium hydroxide in methanol. After about 4 minutes, the solution set up to a stiff gel. This gel was cut off into small pieces and leached for 3 hours in a 5 percent methanolic sodium hydroxide solution. The supernatant liquid was then decanted, and 40 ml. of a 1 N aqueous sodium hydroxide solution was added. When this mixture was warmed to 60° C. with stirring, a smooth dope was formed which was precipitated by pouring into a large excess of stirred methanol. The resulting white, fibrous polymer was thoroughly washed in methanol and dried. A small portion of this polymer was redissolved in water and made just acid to Congo red, using hydrochloric acid. The resulting solution was dialyzed against distilled water, and when the dialyzed solution was evaporated to dryness, a clear, tough, colorless film was obtained having a nitrogen content of 1.9% and a carboxyl content of 4.8%.

Example 10

The polymers and the copolymers embodying the invention are readily acetalized by reacting them with an aldehyde. In some cases, it is desirable to modify the polymers by forming the acetal in order to obtain the exact solubility and permeability characteristics which are desired. Any of the well known aldehydes, and particularly the lower aldehydes, can be used for this purpose. Thus 150 g. of an approximately 30 percent solution of a copolymer of vinyl acetate and allyl (carbethoxymethyl)carbamate containing about 14 percent by weight of combined allyl (carbethoxymethyl) carbamate was mixed with 55 g. of paraldehyde and 13.5 g. of concentrated hydrochloric acid. The resulting solution was heated in a 40° C. constant temperature bath; and, after 3 days, 20 g. of anhydrous sodium acetate was added to the solution, which was then stirred thoroughly. The resulting mixture was then diluted with an equal volume of methanol, and the acetal derivative was precipitated into distilled water. The white, fibrous precipitate thereby obtained was redissolved in methanol, reprecipitated into distilled water, thoroughly washed with water, and dried at 40° C. This product had a nitrogen content of 1.2 percent.

*Example 11*

Acetals derived from the copolymers embodying this invention are readily hydrolyzed by treatment with aqueous alkali. Thus 5 g. of the acetal as prepared in the preceding example was mixed with 25 ml. of 1 N sodium hydroxide solution, and the resulting heterogeneous mixture was heated in a 60° C. bath with occasional stirring. After two hours a clear, stable gel had formed. This was chilled to 5 to 10° C. and some ice cold water was added with stirring. The gel formed a smooth solution with the cold water, and this solution was poured into a large volume of dilute acetic acid with stirring. A white, fibrous precipitate formed, and this precipitate was thoroughly washed in distilled water and dried at 40° C. This material was soluble in many common organic solvents and in cold dilute ammonium hydroxide solution. Such a solution when warmed to 60° C. set to a clear gel. The carboxyl value of this product was 5.4 percent. Thus by hydrolysis of the acetal a modified product exhibiting inverse solubility was obtained.

*Example 12*

The acetal derived from a carbamate copolymer embodying this invention can also be modified by treatment with ammonia or ammonium hydroxide. Five g. of an acetal prepared as in Example 10 was mixed with 50 ml. of concentrated ammonium hydroxide in a closed bottle and allowed to stand at room temperature. After 3 days the mixture had changed from a heterogeneous slurry to a clear, colorless gel. This gel, when chilled to 0° C., formed a clear, colorless solution. When the solution was diluted with ice water and poured into warm, dilute acetic acid, a white, fibrous precipitate was obtained. This precipitate was again dissolved in ice water and precipitated by pouring the solution into agitated warm distilled water to give a white, fibrous polymer which was dried at 40° C. and which contained 2.4% nitrogen and 1.9% carboxyl.

*Example 13*

The monomers embodying the invention can be copolymerized with two or more monomeric materials if desired. Thus a solution containing 86 g. of vinyl acetate, 4.5 g. of N-octadecyl crotonamide, 1 g. of allyl N-carbethoxymethylcarbamate, 0.5 g. of benzoyl peroxide and 40 ml. of methanol was kept at 60° C. for 96 hours. The resulting clear, viscous dope was diluted with 170 ml. of methanol and treated with 25 ml. of 10 percent sodium hydroxide in methanol. The gel that formed was washed with methanol and then treated with 700 ml. of 1 N sodium hydroxide for 18 hours at 50° C. After decantation of the alkali, the soft gel was washed, dissolved in hot dilute ethanol, neutralized with acetic acid, precipitated in methanol, washed and dried. The product which was obtained weighed 39 g. and had an inherent viscosity of 0.47.

*Example 14*

As has been described hereinabove, the monomers embodying this invention can be copolymerized with any of the monomeric materials having a vinylic unsaturation. Thus a solution of 5 g. of allyl (carbethoxymethyl)carbamate, 15 g. of methyl methacrylate, and 0.05 g. of benzoyl peroxide was sealed in a glass tube and heated in a 60° C. bath. After 17 hours, a hard, clear, colorless mass was formed which was dissolved in acetone, and the solution poured into an excess of alcohol. The precipitate was again dissolved in acetone and poured into water to give a white, fibrous polymer, which contained 2.3 percent by weight of the allyl (carbethoxymethyl)carbamate.

*Example 15*

A mixture of 3 g. of allyl (carboxymethyl)carbamate, 7 g. of styrene, and 0.05 g. of benzoyl peroxide was sealed in a glass tube and heated at 60° C. After two days, a hard, colorless, translucent polymer was formed.

*Example 16*

To a solution of 0.5 g. of potassium persulfate and 0.2 g. of sodium bisulfite in 500 cc. of boiled distilled water was added 47.5 g. of acrylonitrile and 2.5 g. of allyl (carboxymethyl)carbamate. This mixture was stirred under nitrogen in a 40° C. bath. Polymerization started in about one minute, and after 6 hours at 40° C., the white slurry was filtered off, washed with water, and dried at 40° C. The product thus obtained weighed 45 g. and was soluble in dimethyl formamide to give a solution practically free from color. The copolymer showed approximately 1.1% by weight of combined allyl (carboxymethyl)carbamate upon analysis. This modified polymer was suitable for use in preparing synthetic fibers. The presence of the carboxyl groups modifies the polymer so as to give a much greater affinity for dyes than is the case with polyacrylonitrile alone.

*Example 17*

The monomers embodying this invention include the phenyl carbamates, as well as the alkyl carbamates. These phenyl carbamates are readily prepared in the same manner as are the alkyl carbamates. Thus 177 g. of 4-carbomethoxyphenyl isocyanate was mixed with 200 g. of allyl alcohol. The reaction was exothermic, and it was necessary to cool the flask. A crystalline sludge formed which was heated on the steam bath for one hour. The reaction product was then diluted with ethanol and filtered to give crystalline allyl (4-carbomethoxyphenyl)carbamate in a yield of 85 percent. The recrystallized product melted at 164–5° C. and analyzed for C, 61.3; H, 6.4; and N, 6.4 as compared to a calculated analysis of C, 61.3; H, 5.5 and N, 6.0.

*Example 18*

The aromatic carbamate derivatives copolymerize in the same manner as do the corresponding alkyl carbamate derivatives. Thus a solution of 1 g. of allyl (4-carbomethoxyphenyl)carbamate, 9 g. of vinyl acetate, 0.05 g. of benzoyl peroxide and 10 ml. of dioxane was placed in a glass tube, the tube sealed off and placed in a 50° C. constant temperature bath. After two days, the solution was clear and viscous. It was diluted with methanol and poured into hot water to give a soft, gummy, white precipitate, which was dried at 40° C.

Similar results are obtained with other allyl and methallyl carboxy or carbalkoxy carbamates with these and similar copolymerizable materials. The carbamate content in the polymers embodying this invention can range from as little as 0.5 or 1.0 percent by weight of the polymer weight in the case of the copolymer to as much as 100 percent by weight in the case of the homopolymer.

The amount of the carbamate monomer which is employed in practicing the invention can, therefore, be varied as desired, depending upon the chemical and physical characteristics which are desired in the final product. In the copolymer in which the combined carbamate monomer forms a minor percentage, and particularly those in which it forms less than about 15 percent by weight of the total polymer, the carbamate monomer acts as a modifier for the other monomeric material. Thus polymeric products can be obtained which approach the properties of the other monomer when polymerized alone, but which in addition have the increased water permeability and affinity for dyes which is characteristic of polymers containing free carboxyl groups.

By a suitable choice of ingredients, the polymers can be prepared so as to exhibit inverse solubility, and gel-forming polymers are readily obtained. The degree of solubility of the polymers can also be varied to give polymers which range from those which are completely soluble in water through those which are insoluble in water but soluble in alkaline solutions and up to polymers which are sparingly soluble or insoluble in aqueous solutions, but which are readily soluble in organic solvents. Thus by means of this invention, a large number of polymeric materials having properties which are particularly useful in the photographic field, as well as in the textile field, are readily obtained. The homopolymers and copolymers embodying the invention can be used alone or in admixture with gelatin or with other polymeric materials. Thus, for example, it is sometimes desirable to form mixtures of the polymers embodying this invention with larger amounts of a polymer which is particularly adapted for making fibers. These mixtures can be readily spun from the usual spinning solutions to give fibers which have excellent dyeing characteristics. The solubility characteristics of the polymers make them particularly useful in applications where water permeability is desired, but in which complete water solubility is objectionable.

Although the invention has been described in considerable detail with particular reference to certain preferred embodiments thereof, variations and modifications can be effected within the spirit and scope of the invention as described hereinabove and as defined in the appended claims.

We claim:
1. A polymer of 15–100% by weight of monomeric material of the formula

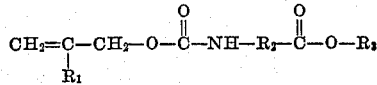

wherein $R_1$ is selected from the group consisting of hydrogen and methyl groups, $R_2$ is selected from the group consisting of alkylene groups of from 1 to 6 carbon atoms and phenylene groups, and $R_3$ is selected from the group consisting of hydrogen and alkyl groups of from 1 to 4 carbon atoms, and 0–85% by weight of a monoethylenically-unsaturated polymerizable monomer containing a single $CH_2=C<$ group and selected from the group consisting of vinyl esters containing 4–6 carbon atoms, lower alkyl esters of acrylic and methacrylic acids, styrene and acrylonitrile.

2. A homopolymer of a monomeric material of the formula

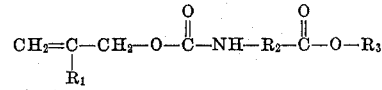

wherein $R_1$ is selected from the group consisting of hydrogen and methyl groups, $R_2$ is selected from the group consisting of alkylene groups of from 1 to 6 carbon atoms and phenylene groups, and $R_3$ is selected from the group consisting of hydrogen and alkyl groups of from 1 to 4 carbon atoms.

3. A copolymer of 50–85% by weight of a monoethylenically-unsaturated polymerizable monomer containing a $-CH=C<$ group and selected from the group consisting of vinyl esters containing 4–6 carbon atoms, lower alkyl esters of acrylic and methacrylic acids, styrene and acrylonitrile, and 50–15% by weight of a polymerizable monomeric material of the formula

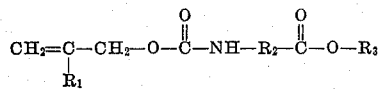

wherein $R_1$ is selected from the group consisting of hydrogen and methyl groups, $R_2$ is selected from the group consisting of alkylene groups of from 1 to 6 carbon atoms and phenylene groups, and $R_3$ is selected from the group consisting of hydrogen and alkyl groups of from 1 to 4 carbon atoms.

4. A copolymer of 50–85% by weight of a vinyl ester containing 4–6 carbon atoms and 50–15% by weight of an allyl N-carboxyalkyl carbamate of from 6 to 11 carbon atoms.

5. A copolymer of 50–85% by weight of a vinyl ester containing 4–6 carbon atoms and 50–15% by weight of an allyl N-carbalkoxyalkyl carbamate of from 7 to 15 carbon atoms.

6. A copolymer of 50–85% by weight of vinyl acetate and 50–15% by weight of an allyl N-carboxyalkyl carbamate of from 6 to 11 carbon atoms.

7. A copolymer of 50–85% by weight of vinyl acetate and 50–15% by weight of an allyl N-carbalkoxyalkyl carbamate of from 7 to 15 carbon atoms.

References Cited in the file of this patent

UNITED STATES PATENTS

| | | |
|---|---|---|
| 2,508,249 | Gleim | May 16, 1950 |
| 2,522,393 | Milone | Sept. 12, 1950 |

FOREIGN PATENTS

| | | |
|---|---|---|
| 459,089 | Canada | Aug. 23, 1949 |

OTHER REFERENCES

Fieser and Fieser: "Organic Chemistry," page 237 (1950), second ed., D. C. Health & Co., Boston.